United States Patent [19]

Wolf et al.

[11] Patent Number: 4,495,229

[45] Date of Patent: Jan. 22, 1985

[54] ONE-COMPONENT, HEAT-CURING POLYURETHANE-COATINGS, STABLE IN STORAGE

[75] Inventors: Elmar Wolf, Recklinghausen; Felix Schmitt, Herten, both of Fed. Rep. of Germany

[73] Assignee: Chemische Werke Huls Aktiengesellschaft, Marl, Fed. Rep. of Germany

[21] Appl. No.: 499,786

[22] Filed: May 31, 1983

[30] Foreign Application Priority Data

Jun. 8, 1982 [DE] Fed. Rep. of Germany ....... 3231558

[51] Int. Cl.$^3$ .................... B05D 3/02; C08G 18/81; C08G 18/10; C08G 18/32
[52] U.S. Cl. ................ 427/388.2; 427/389.7; 427/393.5; 528/45; 528/61
[58] Field of Search ............... 528/45, 61; 427/385.5, 427/393.5, 389.7, 388.2

[56] References Cited

U.S. PATENT DOCUMENTS 3,115,479 12/1963 Windemuth et al. ............... 528/45

Primary Examiner—Michael R. Lusignan

Attorney, Agent, or Firm—Oblon, Fisher, Spivak, McClelland & Maier

[57] ABSTRACT

A polyurethane one-component heat-curing coating which is stable in storage and is hardened above a temperature of about 120° C., comprising a polyol compound having a low glass transition temperature, and a blocked polyisocyanate compound, wherein the blocked polyisocyanate compound is the reaction product of a polyisocyanate compound and a secondary amine compound having the formula:

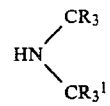

wherein R is selected from the group consisting of hydrogen atom, $C_3$–$C_9$ alkyl radical, unsubstituted cycloalkyl radical, cycloalkyl radical substituted by $C_1$–$C_4$ alkyl radicals, or heteroatom-containing cycloalkyl radical, wherein each R is identical to or different from each other; $R^1$ is selected from the group consisting of alkyl radical, or cycloalkyl radical, wherein each $R^1$ is identical to or different from each other; or R and $R^1$ are chemically bonded therebetween, thereby forming a ring structure.

12 Claims, No Drawings

ONE-COMPONENT, HEAT-CURING POLYURETHANE-COATINGS, STABLE IN STORAGE

BACKGROUND OF THE INVENTION

Field of the Invention

This invention relates to the use of specially blocked polyisocyanates having a latent isocyanate (NCO) content as a hardener of polyols.

Description of the Prior Art

Blocked polyisocyanates are used in the production of thermosetting 1-K-PUR baking systems stable in storage at room temperature. A mixture of a polyisocyanate and a polyol is only stable in storage at room temperature and is only workable at a higher temperature with pigments and other additives if the reactive NCO groups are blocked and, hence, are unable to react. In the hardening stage, the blocking agents must, of course, be able to split off.

The masking or blocking of polyisocyanates is a procedure which has long been known for the temporary protection of NCO groups. The production of such masked isocyanates, is described, for example, in *Houben-Weyl*, "Methods of Organic Chemistry," XIV/2, pages 61-70. The literature cites various blocking agents, for example, tertiary alcohols, phenols, acetoacetic ester, ethyl malonate, acetyl acetone, phthalimide, imidazole, hydrochloric acid, and hydrocyanic acid. Also described are ε-caprolactam and phenol which have achieved technical importance. Such isocyanates blocked with ε-caprolactam and phenol are described in DE-OS No. 21 66 423. The masked isocyanates have the property of reacting like isocyanates at a raised temperature. The greater the acidity of the hydrogen atom of the masking group, the easier the splitting off.

However, a serious disadvantage in the use of phenols or ε-caprolactam as blocking agents is, for a number of applications, the relatively high temperature required for splitting off. For most polyisocyanates, the splitting temperature required when using these two blocking agents is at least 140° C. or more. However, there is great interest in polyisocyanates which deblock at lower temperatures.

Therefore, a need continues to exist for a polyisocyanate blocking agent which allows deblocking of the blocked polyisocyanate at considerably lower temperatures than is possible with the customary blocking agents.

SUMMARY OF THE INVENTION

Accordingly, it is an object of this invention to provide a polyisocyanate blocking agent which may be removed or deblocked from a blocked polyisocyanate of considerably lower temperatures than is possible with the customary blocking agents.

It is also an object of the present invention to provide a process by which polyisocyanate compounds may be blocked in a simple manner.

Moreover, it is also an object of the present invention to provide a polyurethane one-component heat-curing coating, made of polyols and blocked polyisocyanates, which is stable in storage, but which may be hardened at temperatures above 120° C.

According to the present invention, the foregoing and other objects are attained by providing a polyurethane one-component heat-curing coating, made of a polyol and a blocked polyisocyanate, which is stable in storage and may be hardened above 120° C., wherein the blocked polyisocyanate is a reaction product of a polyisocyanate and a secondary amine having the formula:

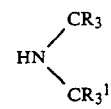

wherein R is a hydrogen atom, $C_3$–$C_9$ alkyl, unsubstituted cycloalkyl, cycloalkyl substituted by $C_1$–$C_4$ alkyl, heteroatom-containing cycloalkyl, unsubstituted aralkyl, aralkyl substituted by $C_1$–$C_4$ alkyl or heteroatom-containing aralkyl radicals, wherein each R may be identical to or different from each other; $R^1$ is an alkyl, cycloalkyl, or aralkyl radical, wherein each $R^1$ may be identical to or different from each other; and R and $R^1$ may form a common ring structure.

DETAILED DESCRIPTION OF THE PREFERRED EMBODIMENTS

According to the present invention, a polyurethane one-component heat-curing coating, made of a polyol and a blocked polyisocyanate, is formed which is stable in storage and which hardens at a temperature above 120° C.

Surprisingly, it has now been discovered that it is possible to produce, in a simple manner, blocked polyisocyanates that may be deblocked at considerably lower temperatures than the isocyanates masked with the customary blocking agents, if certain secondary amines are used for the production of the blocked polyisocyanates. The polyurethane one-component heat-curing coating of the present invention is made of a polyol and a blocked polyisocyanate, wherein the blocked polyisocyanate is a reaction product of a polyisocyanate and a secondary amine having the formula:

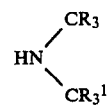

wherein R may be a hydrogen atom, $C_3$–$C_9$ alkyl, unsubstituted cycloalkyl, cycloalkyl substituted by $C_1$–$C_4$ alkyl, heteroatom-containing cycloalkyl, unsubstituted aralkyl, aralkyl substituted by $C_1$–$C_4$ alkyl or heteroatom-containing aralkyl radicals, wherein each R may be identical to or different from each other; $R^1$ is an alkyl, cycloalkyl, or aralkyl radical, wherein each $R^1$ may be identical to or different from each other; and R and $R^1$ may form a common ring structure. In forming the blocked polyisocyanates of the present invention, 0.5 to 1 mole of secondary amine may be used for one isocyanate group, however, it is preferable to use 0.8 to 1 mole of secondary amine for one isocyanate group.

It is surprising that amines, secondary as well as primary, have not been described as blocking agents for polyisocyanates in the literature. There are a number of U.S. patents wherein ureas derived from mono- and diisocyanates and primary or secondary amines are described as epoxy resin hardeners, for example U.S. Pat. Nos. 3,227,679; 3,317,612; 3,321,549; 3,789,071;

3,407,175; and 3,956,237. In this process, the hardening takes place for the most part through a reaction of the urea group with the epoxide group, with an oxazolidinone ring being formed. However, there are no references in the literature, at splitting temperatures below 200° C., pertaining to ureas derived from polyisocyanates and secondary amines as heat-curing hardeners for polyols. It must be stressed that not all secondary amines are suitable for the production of the compounds appropriate to the invention. The amines that may be used according to the invention must provide steric hindrance; thus, for example, di-n-propylamine in contrast to di-isopropylamine is not suitable as a blocking agent because the polyurethanes produced with di-n-propylamine are too stable. The greater the steric hindrance of the secondary amine—more precisely, the steric shielding of the H atom bound to the N—the lower the splitting temperature of the polyisocyanate blocked therewith.

The following are suitable as initial compounds which may be blocked with the secondary amines according to the present invention: polyisocyanates, especially diisocyantes such as aliphatic, cycloaliphatic, araliphatic, aryl-substituted aliphatic and/or aromatic diisocyanates, as they are described, for example, in Houben-Weyl, "Methods of Organic Chemistry," Volume XIV/2, pages 61-70, and in the article by W. Siefken in "Justus Liebigs Annalen der Chemie" 562, pages 75-136, including such compounds such as 1,2-ethylene diisocyanate, 1,4-tetramethylene diisocyanate, 1,6-hexamethylene diisocyanate, 2,2,4- or 2,4,4-trimethyl-1,6-hexamethylene diisocyanate (TMDI), 1,12-dodecane diisocyanate, W,W$^1$-diisocyanate dipropylether, cyclobutane-1, 3-diisocyanate, cyclohexane-1,3- and 1,4-diisocyanate, 3-isocyanate methyl-3,5,5-trimethylcyclohexyl isocyanate, which is also called isophorone diisocyanate and is also abbreviated as IPDI, decahydro-8-methyl-(1,4-methanonaphthalene-2 (or 3) 5-ylene dimethylene diisocyanate, decahydro-4,7-methano-inda-1 (or 2) 5 (or 6) ylene dimethylene diisocyanate, hexahydro-4-7-methane indan-1-(or 2) 5 (or 6)-ylene diisocyanate, hexahydro-1,3- or 1,4-phenylene diisocyanate, 2,4- and 2,6-hexahydrotoluene diisocyanate, perhydro-2,4'-and/or-4,4'-diphenyl methane diisocyanate, W,W$^1$-diisocyanate-1,4-diethylbenzene, 1,4-phenylene diisocyanate, 4,4'-diisocyanate diphenyl, 4,4'-diisocyanate-3,3'-dichlordiphenyl, 4,4'-diisocyanate-3,3'-dimethoxydiphenyl, 4,4'-diisocyanate-3,3'-dimethyldiphenyl, 4,4'-diisocyanate-3,3'-diphenyldiphenyl, 4,4'-diisocyanatediphenylmethane, naphthylene-1,5-diisocyanate, toluene diisocyanate, toluylene-2,4- or 2,6-diisocyanate, N,N'-(4,4'-dimethyl-3,3'-diisocyanate diphenyl)-uretdione, m-xylylene diisocyanate, but also the triisocyanates such as 2,4,4-triisocyanate diphenylether, 4,4',4''-triisocyanatetriphenylmethane, tris(4-isocyanate phenyl)-thiophosphate. Additional suitable isocyanates are described in the above-mentioned article in the "Annalen" on page 122 ff.

Particularly preferred are the commercially accessible aliphatic, cycloaliphatic and aromatic diisocyanates and especially 3-isocyanatomethyl-3,5,5-trimethylcyclohexylisocyanate and toluene diisocyanate and their isomer mixtures.

In addition to the monomer polyisocyanates, the dimer and trimer forms of the polyisocyanates, such as uretdiones and isocyanurates can, of course, also be used. The latter two can be produced according to well-known methods.

The polyisocyanates which may be used according to this invention also include those which prior to blocking with the secondary amines are subjected to a reaction to increase the size of the molecule with the so-called chain extending agents customary in isocyanate chemistry, such as, for example, polyols, whereby the bi- or trifunctional chain extending agents, that is, those with groups capable of reacting with isocyanate groups, such as, for example, hydroxyl-group-bearing compounds, are used in such quantities that the resulting new isocyanate carries at least two isocyanate groups.

Suitable polyols which may be used as chain extending agents, are, for example, diols and triols, such as ethylene glycol, propylene glycol, 1,2- and 1,3-propane diol and 2,2-dimethylpropane diol-(1,3); butanediols, such as butanediol-(1,4); hexanediols, such as hexanediol-(1,6), 2,2,4-trimethylhexanedio-(1,6), 2,4,4-trimethylhexanediol-(1,6); and heptanediol-(1,7), octadecene-9, 10-diol-(1,12), thiodiglycol, octadecanediol-(1,18), 2,4-dimethyl-2-propylheptanediol-(1,4), butene- or butinediol-(1,4), diethylene glycol, triethylene glycol, trans- and cis-1,4-cyclohexanedimethanol, 1,4-cyclohexanediols, glycerin, hexanetriol-(1,2,6), 1,1,1-trimethylolpropane, and 1,1,1-trimethylolethane. Mixtures of the above-mentioned compounds may also be used.

The reaction of the polyisocyanates, prior to blocking, with the mentioned chain extending agents in the cited proportions can be carried out at temperatures ranging from 0° to 150° C., preferably at 80°-120° C.

Suitable secondary amines which may be used according to this invention which are in accordance with the formula described earlier are, for example, diisopropylamine, isopropyl-tert.-butylamine,-dicyclohexylamine, di-(3,5,5-trimethylcyclohexyl) amine, 2,6-dimethylpiperidine, 2,5-dimethylpyrrolidine, 2,2,6,6-tetramethylpiperidine, 2,2,4,6-tetramethylpiperidine, isopropylcyclohexylamine, and others. Mixtures of the second amines appropriate to the invention may also be used.

The reaction of the polyisocyanates with secondary amines may be performed with solvents as well as by melting. If a solvent is involved, the amount of the secondary amine added to the polyisocyanate heated to 70°-120° C. is such that the temperature of the reaction mixture does not exceed 130° C. After all of the blocking agent has been added, the reaction mixture continues to be heated for about another hour at about 100°-120° C. to complete the reaction.

While the blocking may be carried out using solvents, the solvents which can be considered for this reaction must not react with polyisocyanates. Examples of such solvents are ketones, such as acetone, methylethylketone, methylisobutylketone, cyclopentanone, cyclohexanone; aromatics, such as benzene, toluol, cyclols, chlorobenzene, nitrobenzene; cyclic ethers, such as tetrahydrofuran, dioxane; chlorinated hydrocarbons, such as chloroform, carbon tetrachloride; and aprotic solvents, such as dimethylformamide, dimethylacetamide, and dimethylsulfoxide.

The adducts thus obtained, in general, are compounds having a molecular weight of 300-2500, preferably 300-1000. The process products have a melting temperature range of 30°-220° C., preferably 80°-160° C. The polyisocyanates blocked with the secondary amines are further characterized by containing isocyanate groups in final blocked form (calculated as NCO) of 4-25% by weight, preferably 10-21% by weight.

The process products are suitable especially as hardeners for higher functional compounds having Zerewitinoff-active hydrogen atoms. In combination with compounds having Zerewitinoff-active hydrogen atoms, the process products form above 120° C., preferably 130°–200° C., systems hardenable into high-grade plastics.

The most important field of application for the compounds according to the invention is their use as a bonding agent for solvent-containing 1-K-PUR coating.

Suitable reactants with the process products for the production of such heat-hardenable systems are compounds containing at least two hydroxyl or amino groups. The use of polyhydroxyl compounds, especially those with a molecular weight of 400–2000 is preferred. These OH-containing compounds are polyesters, polyethers, polyacetals, polyesteramides, and polyepoxides preferably containing 2–6 hydroxyl groups.

The hydroxyl-containing polyesters according to the invention must have a low glass transition temperature; it should be below 20° C. and above −25° C. Significant component polyesters are:

(1) Cyclic polycarboxylic acids and their esters and anhydrides, for example, phthalic acid, isophthalic acid, terephthalic acid, benzene,1,2,4-tricarboxylic acid, trimellitic acid anhydride, dimethylterephthalate (DMT) and their hydrogenation products.

(2) Diols, for example, ethylene glycol, 1,2-propanediol, 1,2- or 1,3- or 1,4-butanediol, 2,2-dimethylpropanediol, 3-methylpentanediol-1,5, hydroxypivalic acid neopentyl glycol ester, hexanediol-1,6, cyclohexane diol, 4,4-dihydroxydicyclohexyl propane-2,2, 1,4-dihydroxymethylcyclohexane, diethelene glycol, and triethylene glycol.

(3) Polyols, such as glycerin, hexanetriol, pentaerythrite, trimethylolpropane, and trimethylolethane.

Proportionately, the polyesters may also contain monofunctional carboxylic acids, for example, benzoic acid, as well as acyclic polycarboxylic acids such as adipic acid, 2,2,4-(2,4,4)-trimethyladipic acid, sebacic acid or dodecane dicarboxylic acid. The polyesters are produced in the well-known manner by esterification or interchange of ester radicals possibly in the presence of the usual catalysts, whereby, through the appropriate choice of the COOH/OH ratio, end products are attained whose hydroxyl number is between 40 and 240, but preferably between 70 and 150.

Solvents whose lower boiling point is approximately at 100° C. are suitable for use with the one-component heat-curing coating according to the invention. The upper limit of the boiling point of the solvent intended for use depends on the prevailing baking conditions. If the baking is done at higher temperatures, then the boiling points of the solvents to be used must lie at higher temperatures. The following compounds, among others, may be used as solvents: hydrocarbons, such as toluol, xylol, solvesso 150 (a Shell solvent mixture), tetralin, cumene; ketones, such as methyl isobutyl ketone, diisobutyl ketone, isophorone; and esters, such as acetic acid-n-hexylester, acetic acid butylester, ethylene glycol acetate (EGA), and butyl glycol acetate. The above-mentioned compounds may also be used as a mixture. The concentration of the resin (oxyester)/hardener mixture in the mentioned solvents lies between 40 and 70% by weight.

The one-component heat-curing coating according to this invention may be produced in suitable mixing aggregates, for example in vessels having a stirrer, by simply mixing the three lacquer components (high-boiling-point solvent, polyester, and blocked polyisocyanate) at 80°–100° C.

Further customary additives, such as pigments, flow improvers, gloss improvers, antioxidants, and heat stabilizers may also be added to the coating solution. The one-component coatings are suitable for application especially to metal surfaces; however, they can also be applied to objects made of other materials, such as glass or plastics. The coatings according to the invention are applied primarily to the coil-coating industry for outdoors weather-resisting one-and-two-layer coatings.

The hardening of the coatings according to the invention occurs, depening on application, in a temperature range of 120°–350° C., preferably between 130° and 300° C. during a period from 30 minutes to 30 seconds. The hardened coatings have excellent coating properties.

As is known, in the hardening of PUR coatings the presence of amines leads to yellowing. Therefore, it is a surprising effect of this invention that no discolorations occur during the hardening of the heat-curing coating according to the invention.

The present invention will be further illustrated by certain examples and references which are provided for purposes of illustration only and are not intended to limit the present invention.

I. Production of the Blocked Polyisocyanates

EXAMPLE 1

724 parts by weight of dicyclohexylamine were added drop-by-drop to 444 parts by weight of isophorone diisocyanate (IPDI) at 120° C., so that the temperature of the reaction mixture did not exceed 140° C. After the dicyclohexylamine had been added, heating at 130° C. was continued for about one hour to complete the reaction.

The reaction product so produced had a melting point of 105°–110° C. and a 14.38% content of blocked NCO; free amine was no longer detectable.

EXAMPLE 2

In a manner similar to the process described in Example 1, 226 parts by weight of 2,6-dimethylpiperidine were added to 222 parts by weight IPDI at 130° C. After the 2,6-dimethylpiperidine had been added, heating at 130° C. was continued for about another hour to complete the reaction.

The reaction product so produced had a melting point of 99°–103° C. and an 18.7% content of blocked NCO; free amine was no longer detectable.

EXAMPLE 3

101 parts by weight of diisopropylamine were added drop-by-drop at room temperature over approximately 2 hours to 111 parts by weight of IPDI that had been dissolved in 500 parts by weight of anhydrous acetone. After the diisopropylamine had been added, heating at 50° C. was continued for 2 hours. Thereafter, the acetone was removed by distillation; the last traces of acetone were removed in the vacuum drier at 60° C. and 1 torr. The reaction produce had a melting point of 65°–74° C. and a 19.8% content of blocked NCO.

EXAMPLE 4

530 parts by weight of di-(3,5,5-trimethyl)-cyclohexylamine were added drop-by-drop over a period of about 2 hours to 222 parts by weight of IPDI. After all the amine had been added, heating of the reaction mixtures was continued at 130° C. for another 2 hours. The reaction product had a melting point of 84°–91° C. and an 11.1% content of blocked NCO.

EXAMPLE 5

282 parts by weight of 2,2,4,6-tetramethylpiperidine were added drop-by-drop over a period of approximately 2 hours to 222 parts by weight of IPDI at 130° C. After the 2,2,4,6-tetramethylpiperidine had been added, heating of the reaction mixture at 130° C. was continued for approximately 1 hour.

The reaction product had a melting point of 120°–125° C. and a 16.6% content of blocked NCO. In contrast to the compounds in Examples 1–4, the amine used for blocking was quantitatively detected within about 2 hours during titration with aqueous HCl. Thus the IPDI blocked with 2,2,4,6-tetramethylpiperidine is not hydrolysis resistant.

EXAMPLE 6

202 parts by weight of diisopropylamine were added drop-by-drop within 2 hours to 168 parts by weight of hexamethylene diisocyanate at 130° C. After all the diisopropylamine had been added, heating of the reaction mixture at 130° C. was continued for about 1 hour. The reaction product had a melting point of 130–140° C. and a 22.7% content of blocked NCO.

EXAMPLE 7

41.6 parts by weight of diisopropylamine were added at 100° C. over about 3 hours to 100 parts by weight of IPDI-T 1890 (trimer IPDI; product of the Chemische Werke Huels) with a 17.2% NCO content that had been dissolved in 100 parts by weight of xylol/ethyl glycol acetate (weight ratio: 2:1). Thereafter, heating was continued for 2 hours. The solution thus obtained had a viscosity of 261 mPas at room temperature. The content of blocked NCO was 7.1%.

II. Reactivity of the Compounds According to the Invention

To examine the reactivity of a polyisocyanate, blocked with an amine, with a polyol, the polyisocyanate was kneaded in a kneading chamber with a polyol at a ratio of ($NCO_{block}$:OH=1:1) at various temperatures and the resistance to kneading was followed as a function of time. The resistance to kneading increased to the same extent as the reaction occurred. When cross-linking occurred, the resistance to kneading rose sharply followed by an abrupt drop. The cross-linked product was finely ground and then offered only slight resistance. The polyisocyanate used was a diisocyanate. The results are shown in Table 1.

TABLE 1

| Hardeners | Kneading Behavior of Hardeners/Oxyester P 1137 (NCO:OH = 1:1) at | | |
|---|---|---|---|
| | 120° C. | 160° C. | 180° C. |
| IPDI blocked with piperidine | — | no cross-linking | — |
| IPDI blocked with 2,6-dimethylpiperidine | — | cross-linked after 10 minutes | cross-linked after 4 minutes |
| IPDI blocked with 2,2,4,6-tetramethylpiperidine | immediately cross-linked | — | — |
| IPDI blocked with caprolactam | | | cross-linked after 18 minutes |

P 1137: Oxyester with an OH number of 106–114 and a melting range of from 70–90° C. (product of the Chemische Werke Huels)

III. Application Examples

APPLICATION EXAMPLE 1

(A) Polyester containing hydroxyl groups (production)

7 moles isophthalic acid (1.163 g), 6 moles hexanediol-1,6 (709 g) and 2 moles 1,1,1-trimethylolpropane (268 g) were esterified in a 4-liter glass flask with the admixture of 0.1% by weight of n-dibutyltin oxide. With rising temperature, a homogenous batch developed. At about 195° C., the first separation of water occurred. Within 8 hours, the temperature was raised to 220° C. and at this temperature the esterification was completed during the subsequent 6 hours. The acid number was smaller than 1 mg KOH/g. After the polyester batch had been cooled down to 200° C., the volatile components were removed in a vacuum of 20–30 mm Hg during 30–45 minutes.

During the entire reaction, a weak $N_2$-flow was directed through the reaction system.

Chemical and physical characteristics data of the polyester:

| H number | 105 mg KOH/g |
|---|---|
| Acid number | <1 mg KOH/g |
| Mole weight | 2400 |
| Glass transition temperature | −12° C. to +5° C. |

(B) Blocked isocyanate components

The polyisocyanate described in production Example 3 was used.

(C) PUR heat-curing coating 1000 g of the polyester obtained in part A of this application example are mixed and dissolved with 398 g of the blocked polyisocyanate of production Example 3, in 466 g n-butylacetate and 446 g xylol solvents at 40°–50° C. to form a resin solution. In the customary fashion, a heat-hardening white coating was formulated according to the following composition:

65% by weight of the above-described resin solution;
3% by weight of n-butyl glycol acetate;
2% by weight of isophorone;
28.8% by weight of a white pigment ($TiO_2$);
2% by weight of a 10% solution of a soluble flow improver in ethylglycol acetate; on the basis of an organofunctional silicone oil, and
0.2% by weight dibutyltin dilaurate.

An aluminum sheet was coated with the described coating and hardening was undertaken under varying conditions.

The test results are presented in Table 2.

TABLE 2

| Hardening Condition | Coating Testing | | | | | | | |
|---|---|---|---|---|---|---|---|---|
| | SD | PH | ET | GS | $G_{20}$ | $G_{45}$ | $G_{60}$ | MEK-Test | Yellowing |
| 30 min 110° C. | 40 | 153 | 0.5 | 1 | 90 | 60 | 96 | 60 | none |
| 30 min 120° C. | 30 | 179 | 7.8 | 0 | 87 | 56 | 96 | >200 | none |
| 10 min 140° C. | 35 | 181 | 6.5 | 0 | 90 | 55 | 94 | >200 | none |
| 0.75 min 300° C. | 25 | 174 | 8.5 | 0 | 69 | 56 | 92 | >200 | none |

Explanation of symbols:
SD: coating thickness in μm
PH: Koenig pendulum hardness, DIN 53 157
ET: Erichsen cupping, DIN 53 156
GS: Cross-cut adhesion test, DIN 53 151
G: gloss according to Gardner ASTMD 523

The test data shown in Table 2 illustrates that quantitative cross-linking/hardening is possible with the above-described coating starting from about 120° C. Surprisingly no yellowing occurs despite the aminic blocking agent.

APPLICATION EXAMPLE 2

(A) Polyester containing hydroxyl groups (production)

Analogously to the process described in application Example 1A, a polyester containing hydroxyl groups was produced, whereby the following raw materials were used:
10 moles isophthalic acid (1661 g)
5.5 moles hexanediol-1,6 (650 g)
2.0 moles diethylene glycol (212 g)
4.0 moles trimethylolpropane (537 g)
Characteric values of the polyester:
OH number: 132 mg KOH/g
Acid number: 2 mg KOH/g
The polyester was dissolved in n-butylacetate/xylol solvent (1:1). The solid substance content of the solution was 60% by weight.

(B) Blocked isocyanate components

The blocked polyisocyanate described in production Example 7 was used.

(C) PUR heat-curing coating

A clear coating was formulated according to the following composition:
49.3% solution of the polyester obtained in part A of this application example;
41.5% solution of the blocked polyisocyanate produced in production example 7;
3.0% butylglycol acetate;
2.0% isophorone;
1.0% of a 10% solution of a flow improver in ethylglycol acetate on the basis of an organofunctional silicone oil;
0.2% dibutyl tin dilaurate.

An aluminum sheet was coated with the above-described coating and was hardened under various conditions. The test results are shown in Table 3.

TABLE 3

| Hardening Condition | Coating Testing | | | | | |
|---|---|---|---|---|---|---|
| | SD | PH | ET | GS | MEK-Test | Yellowing |
| 25 min 130° C. | 35 | 186 | 7.0 | 0 | >200 | none |
| 7 min 160° C. | 40 | 193 | 7.8 | 0 | >200 | none |

TABLE 3-continued

| Hardening Condition | Coating Testing | | | | | |
|---|---|---|---|---|---|---|
| | SD | PH | ET | GS | MEK-Test | Yellowing |
| 4 min 180° C. | 40 | 186 | 8.1 | 0 | >200 | none |

Explanation of symbols:
SD: coating thickness in μm
PH: Koenig pendulum hardness, DIN 53 157
ET: Erichsen cupping, DIN 53 156
GS: Cross-cut adhesion test, DIN 53 151
G: gloss according to Gardner ASTMD 523

The test data shown in Table 3 illustrates that cross-linking/hardening of the above-described coating yields results at a temperature of 130° C. which are comparable to those obtained at a temperature of 180° C.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A polyurethane one-component heat-curing coating which is stable in storage and is hardened above a temperature of about 120° C., comprising a polyol compound having a low glass transition temperature, and a blocked polyisocyanate compound, wherein said blocked polyisocyanate compound is the reaction product of a polyisocyanate compound and a sterically hindered secondary amine compound having the formula:

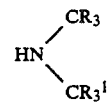

wherein R is selected from the group consisting of a hydrogen atom, $C_3-C_9$ alkyl radical, unsubstituted cycloalkyl radical, cycloalkyl radical substituted by $C_1-C_4$ alkyl radicals, or heteroatom-containing cycloalkyl radical, wherein each R is identical to or different from each other; $R^1$ is selected from the group consisting of alkyl radical or cycloalkyl radical, wherein each $R^1$ is identical to or different from each other; or R and $R^1$ are chemically bonded therebetween, thereby forming a ring structure.

2. The polyurethane one-component heat-curing coating of claim 1, wherein said polyisocyanate compound is a monomeric, dimeric or trimeric polyisocyanate compound.

3. The polyurethane one-component heat-curing coating of claim 1, wherein said polyisocyanate compound is a chain-extending polyisocyanate compound.

4. The polyurethane one-component heat-curing coating of claim 2, wherein said monomeric polyisocyanate is selected from the group consisting of aliphatic, cycloaliphatic, araliphatic, aryl-substituted aliphatic and aromatic diisocyanates and aromatic triisocyanates.

5. The polyurethane one-component heat-curing coating of claim 4, wherein said monomeric polyisocyanate is 3-isocyanato-methyl-3,5,5-trimethylcyclohexylisocyanate.

6. The polyurethane one-component heat-curing coating of claim 4, wherein said monomeric polyisocyanate is toluene diisocyanate and isomer mixtures thereof.

7. The polyurethane one-component heat-curing coating of claim 1, wherein said secondary amine compound is selected from the group consisting of diisopropylamine, isopropyl-tert-butylamine, dicyclohexylamine, di-(3,5,5-trimethylcyclohexyl)amine, 2,6-dimethylpiperidine, 2,5-dimethylpyrrolidine, 2,2,6,6-tetramethylpiperidine, 2,2,4,6-tetramethylpiperidine, and isopropylcyclohexylamine or a mixture thereof.

8. The polyurethane one-component heat-curing coating of claim 1, wherein said polyol compound is selected from the group of polyesters, polyethers, polyacetals, polyesteramides, and polyepoxides.

9. The polyurethane one-component heat-curing coating of claim 8, wherein said polyol has 2 to 6 hydroxyl groups and a molecular weight of about 400 to 2000.

10. The polyurethane one-component heat-curing coating of claim 1, wherein the reaction of said polyisocyanate compound and said secondary amine compound is effected by mixing said polyisocyanate compound with a high-boiling inert organic solvent, heating the mixture of said polyisocyanate compound and said organic solvent to a temperature of about 70° to 120° C., adding said secondary amine compound to the heated mixture such that the temperature of the reaction mixture does not exceed about 130° C., and heating said reaction mixture at about 100° to 120° C. for a period of about an hour, thereby completing said reaction.

11. The polyurethane one-component heat-curing coating of claim 1, wherein the reaction product of said polyisocyanate compound and said secondary amine comprises a compound having a molecular weight in the range of 300 to 2500 with a melting temperature in the range of 30° to 220° C.

12. A method of producing a high quality object made of metal, glass or plastic which comprises applying the polyurethane one-component heat-curing coating of claim 1 to a surface of said object, and heating said object coated with said coating above a temperature of about 120° C. for a period of about 30 minutes to 30 seconds, thereby hardening said coating on the surface of said object.

* * * * *